(12) United States Patent
Yaguchi

(10) Patent No.: US 9,971,178 B2
(45) Date of Patent: May 15, 2018

(54) DISPLAY DEVICE

(71) Applicant: PANASONIC LIQUID CRYSTAL DISPLAY CO., LTD., Hyogo (JP)

(72) Inventor: Takenori Yaguchi, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 115 days.

(21) Appl. No.: 14/880,136

(22) Filed: Oct. 9, 2015

(65) Prior Publication Data

US 2016/0033809 A1 Feb. 4, 2016

Related U.S. Application Data

(63) Continuation of application No. PCT/JP2014/000278, filed on Jan. 21, 2014.

(51) Int. Cl.
*G02F 1/1333* (2006.01)
*G02F 1/133* (2006.01)
*G09G 3/36* (2006.01)

(52) U.S. Cl.
CPC .... *G02F 1/133308* (2013.01); *G02F 1/13306* (2013.01); *G09G 3/36* (2013.01);
(Continued)

(58) Field of Classification Search
CPC ........... G02F 1/133308; G02F 1/13306; G02F 2001/133325; G02F 2001/46; G09G 3/36
(Continued)

(56) References Cited

U.S. PATENT DOCUMENTS

2008/0192168 A1* 8/2008 Sudo ................. G02F 1/133308
349/58
2013/0016524 A1* 1/2013 Momose ........... G02F 1/133308
362/602
(Continued)

FOREIGN PATENT DOCUMENTS

JP 2002-090710 A 3/2002
JP 2007-140560 A 6/2007
(Continued)

OTHER PUBLICATIONS

International Search Report issued in corresponding International Patent Application No. PCT/JP2014/000278, dated Mar. 4, 2014; 4 pages with English translation.

*Primary Examiner* — Charles Chang
(74) *Attorney, Agent, or Firm* — McDermott Will & Emery LLP

(57) ABSTRACT

A display device includes a display panel and a frame that accommodates the display panel. The frame includes at least a first frame and a second frame. The first frame and the second frame are fixed to each other with a fastener. Each of the first frame and the second frame is provided with fastening holes for fixing the first frame and the second frame to each other at positions point symmetric about a center of the corresponding frame in a planar view. The first frame includes at least one first fitting portion. The second frame includes at least one second fitting portion to be fitted with the first fitting portion. The first fitting portion and the second fitting portion are provided at a position point asymmetric about the center of the first frame and the second frame in a planar view, respectively.

9 Claims, 15 Drawing Sheets

(52) U.S. Cl.
CPC ............ *G02F 2001/133325* (2013.01); *G02F 2201/46* (2013.01)

(58) Field of Classification Search
USPC ..................................... 349/58–60
See application file for complete search history.

(56) References Cited

U.S. PATENT DOCUMENTS

| | | | |
|---|---|---|---|
| 2013/0027977 A1* | 1/2013 | Urano ................. | G02B 6/0036 362/613 |
| 2014/0355100 A1* | 12/2014 | Matsuoka ............. | G09G 3/348 359/290 |

FOREIGN PATENT DOCUMENTS

| | | | |
|---|---|---|---|
| JP | 2008-235136 A | 10/2008 |
| JP | 2008-256831 A | 10/2008 |
| JP | 2009-282435 A | 12/2009 |
| JP | 2011-186024 A | 9/2011 |
| JP | 2012-058330 A | 3/2012 |

\* cited by examiner

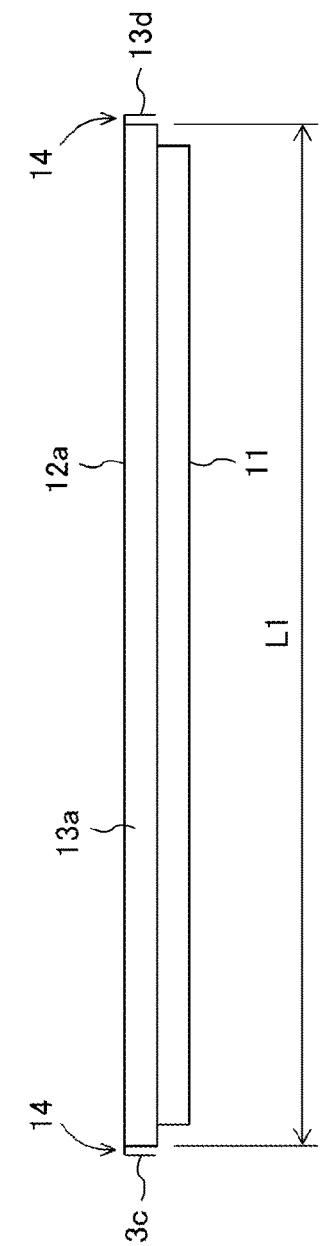
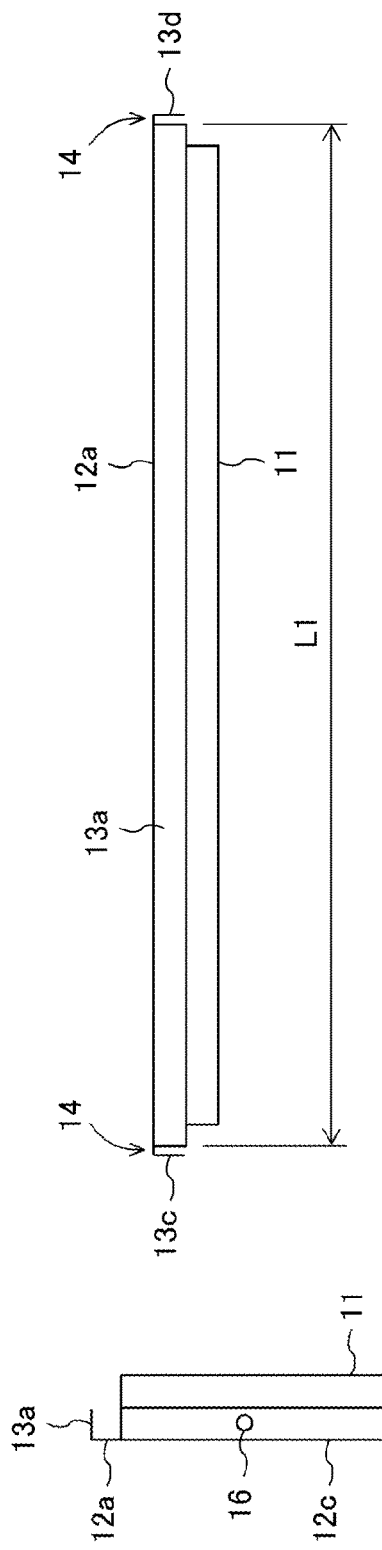
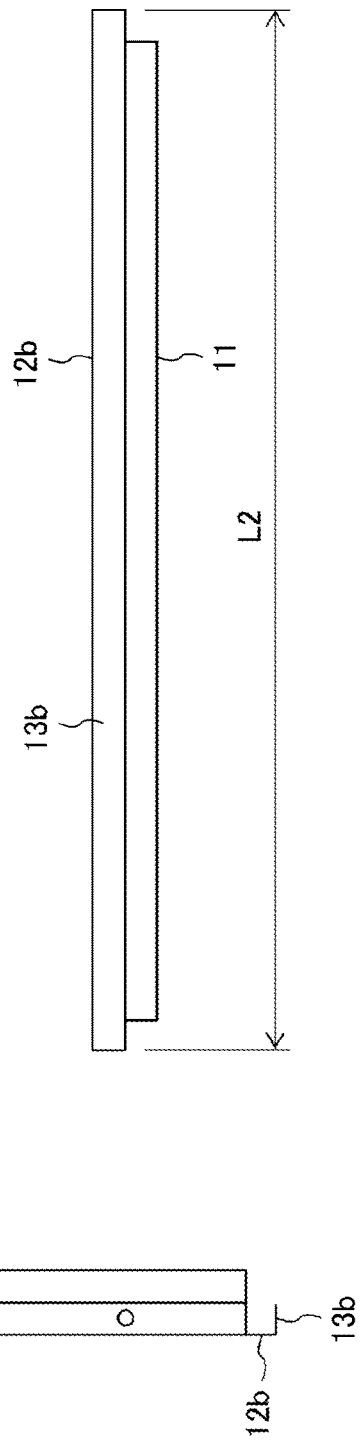

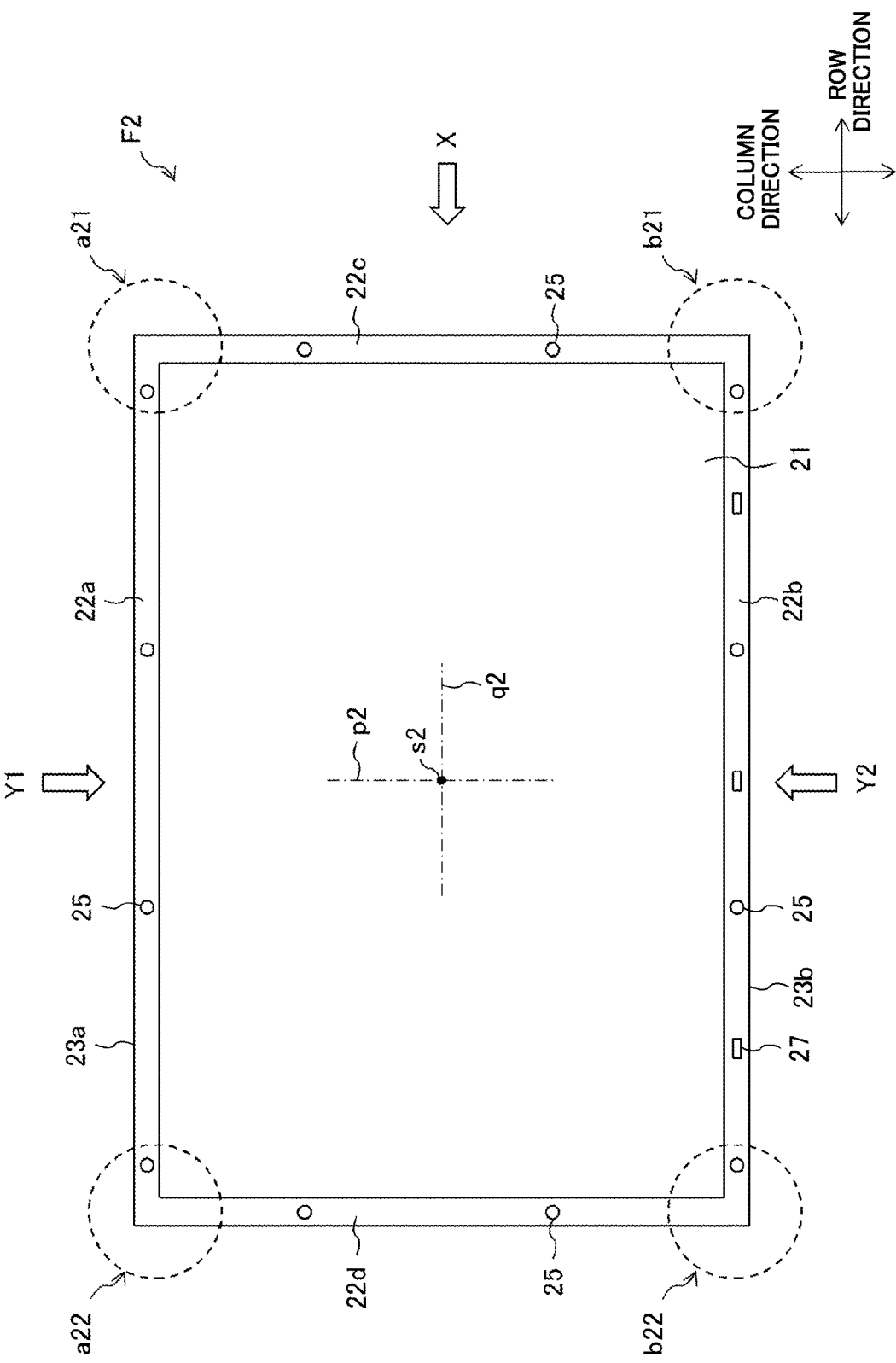

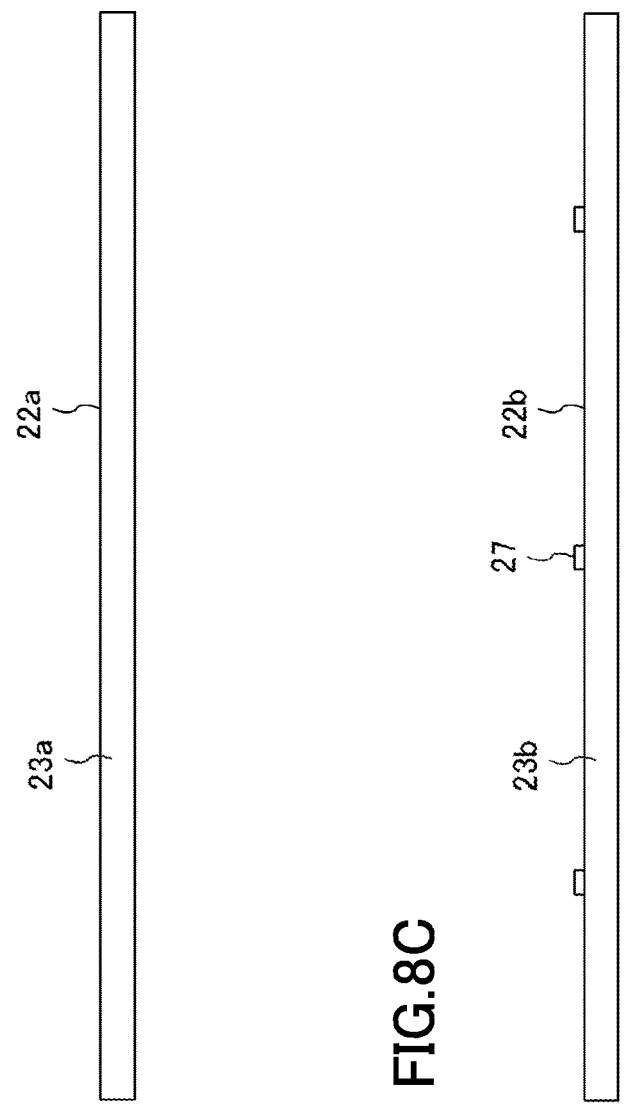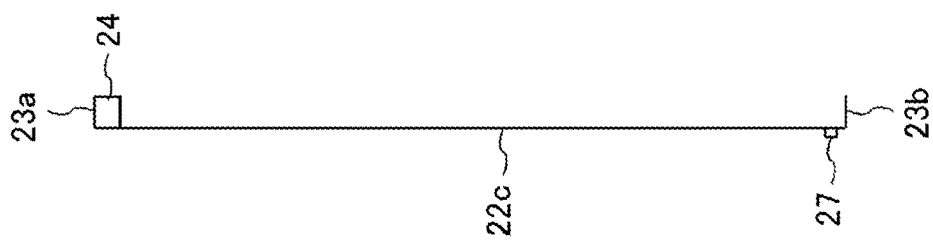

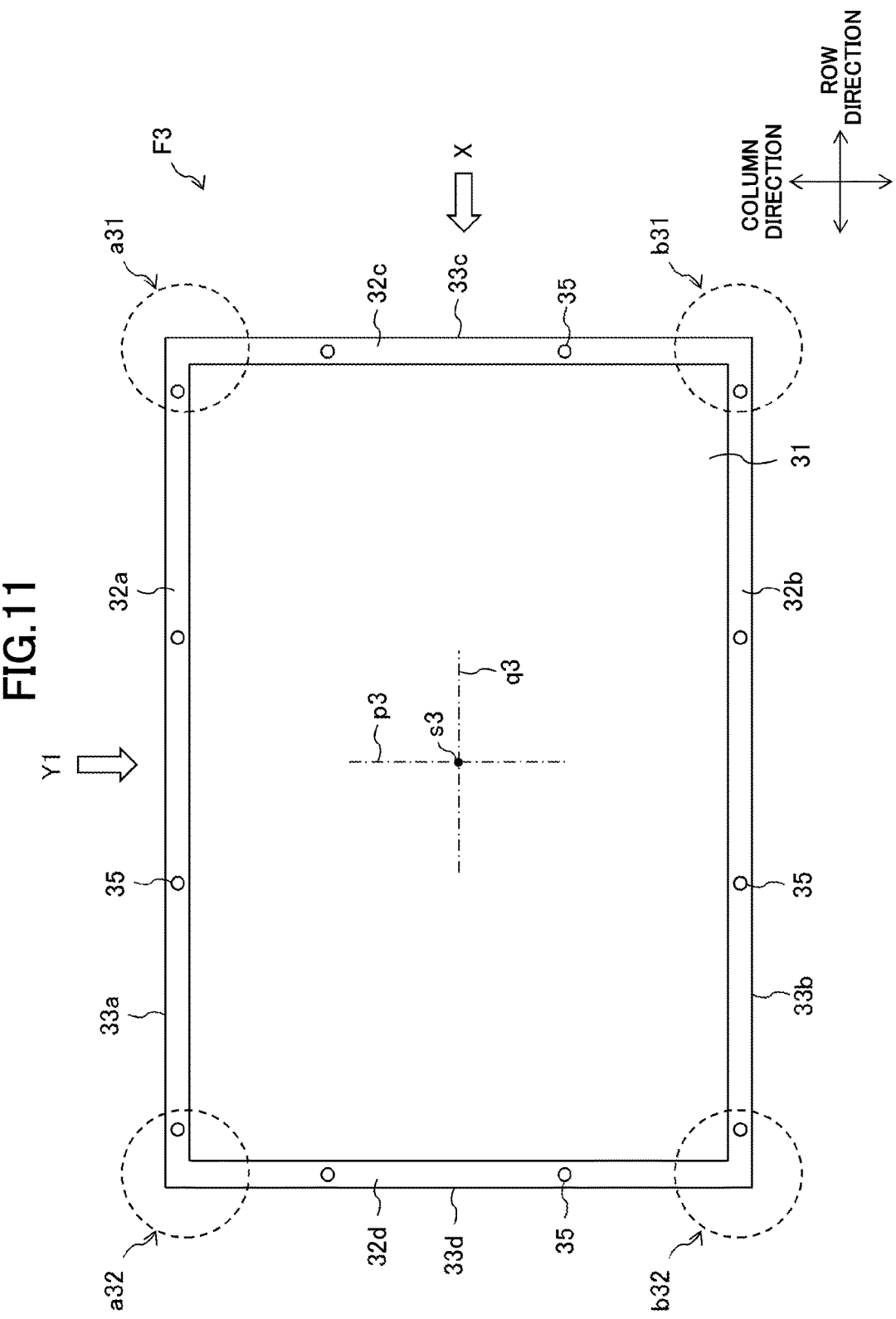

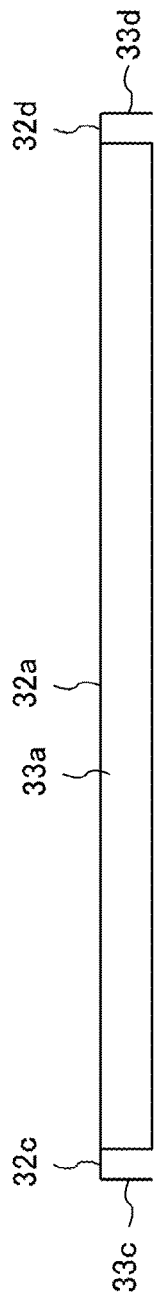
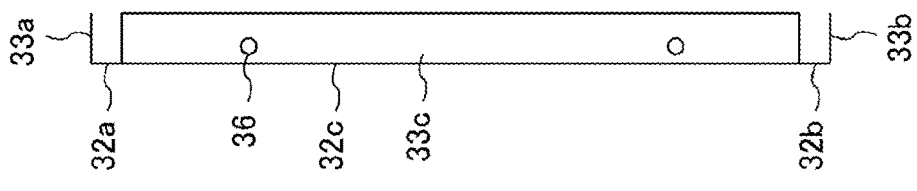
FIG.12B
FIG.12A

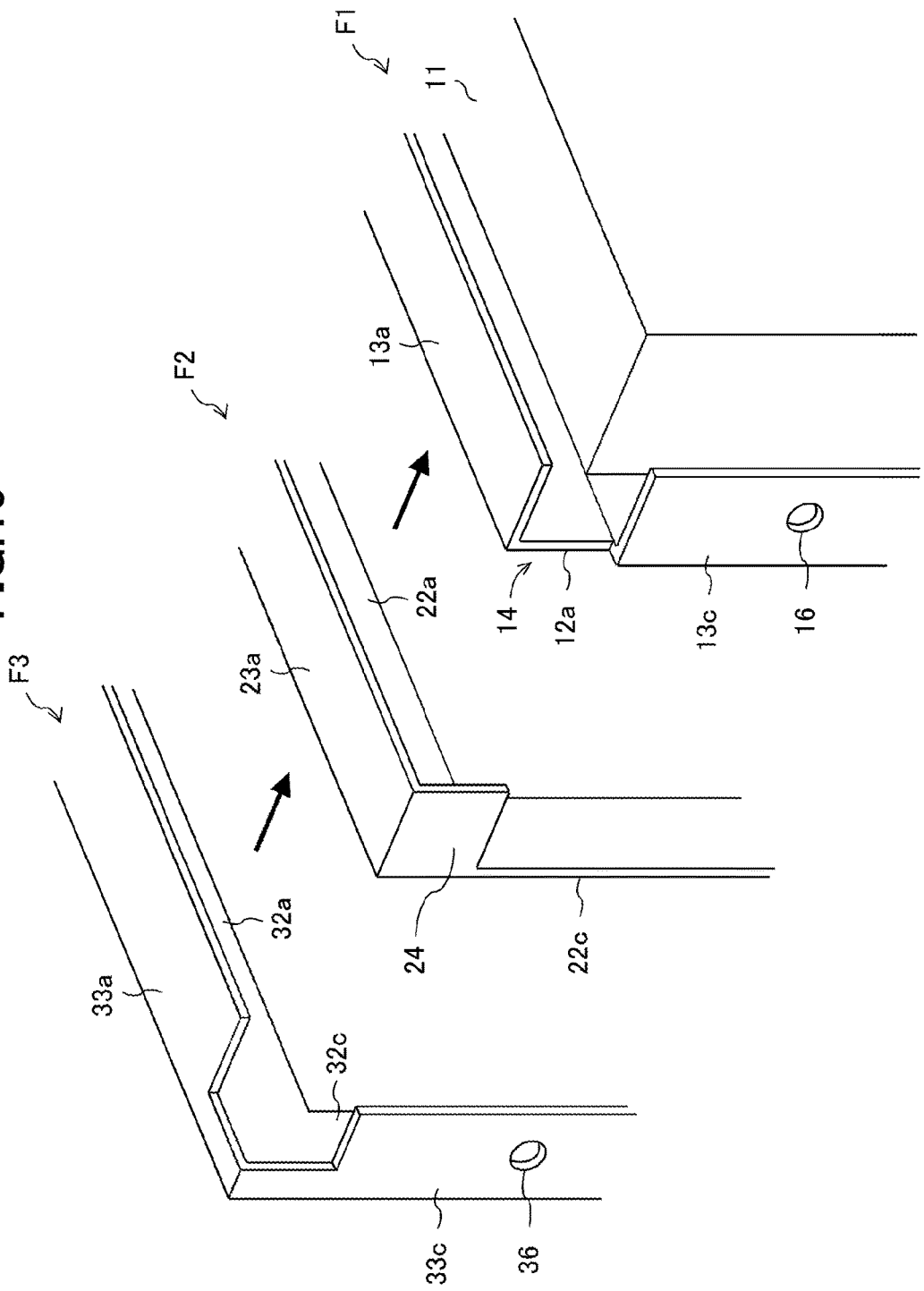

DISPLAY DEVICE

CROSS-REFERENCE TO RELATED APPLICATION

This application is Bypass Continuation of international patent application PCT/JP2014/000278, filed: 2014 Jan. 21 designating the United States of America, the entire disclosure of which is incorporated herein by reference.

TECHNICAL FIELD

The present disclosure relates to a display device and especially a structure of frames which constitute the display device.

BACKGROUND

A display device includes a display panel and a backlight disposed on a rear side of the display panel. Further, the display device is integrally configured with a lower frame that accommodates a light source and an optical sheet that constitute the backlight, a frame-shaped holding frame that holds the display panel to be fixed to the lower frame with a screw, and a frame-shaped upper frame that covers the display panel from a display surface side and is fixed to the lower frame or the holding frame with a screw (see Japanese Unexamined Patent Application Publication No. 2007-140560, for example).

This prior art discloses a technique for fixing frames to each other in such a display device.

Among various types of display devices, there is a display device having drive circuits disposed respectively on the left, right, top and bottom of a display panel. Specifically, the display device is configured such that two source drivers are disposed respectively on the top and bottom of the display panel, and two gate drivers are disposed respectively on the left and right of the display panel. Since components of such a display device seem to be substantially top-bottom and left-right symmetric, there is a possibility that frames may be assembled upside down in a manufacturing process of the display device, for example.

In order to solve such a problem, it is conceivable to make it easier to distinguish top-bottom and left-right orientations of each frame, by providing fastening holes (e.g., threaded) for fixing each frame with a fastener (e.g., screw) at left-right asymmetrical positions, for example. However, providing the fastening positions in a left-right asymmetric manner may possibly make qualities of a display image unbalanced between left and right sides of the image, and thus result in deterioration of display qualities.

SUMMARY

The present disclosure has been made in view of the above problem, and an object of the present disclosure is to provide a display device capable of preventing errors in assembling frames, as well as preventing display qualities from deteriorating.

In one general aspect, the instant application describes a display device which includes a display panel and a frame that accommodates the display panel. The frame may include at least a first frame and a second frame. The first frame and the second frame are fixed to each other with a fastener, each of the first frame and the second frame is provided with fastening holes for fixing the first frame and the second frame to each other at positions point symmetric about a center of the corresponding frame in a planar view. The first frame includes at least one first fitting portion. The second frame includes at least one second fitting portion to be fitted with the first fitting portion. The first fitting portion is provided at a position point asymmetric about the center of the first frame in a planar view. The second fitting portion is provided at a position point asymmetric about the center of the second frame in a planar view.

The above general aspect may include one or more of the following features. The display device may further include a backlight disposed on a rear side of the display panel. The second frame may be a frame-shaped holding frame that holds the display panel, the first frame may be a lower frame that accommodates the backlight, and the frame further include a frame-shaped upper frame that covers the display panel from a display surface side.

Out of four end portions of the lower frame, at least one first end portion may be provided with the first fitting portion, and a second end portion that is point symmetric to the first end portion about the center of the lower frame is provided with no first fitting portion. Out of four end portions of the holding frame, an end portion corresponding to the first end portion may be provided with the second fitting portion, and an end portion corresponding to the second end portion is provided with no second fitting portion.

The first fitting portion may be a cutout. And the second fitting portion may be a projection.

The cutout may be provided such that an upper side of the lower frame including the first end portion is shorter than a lower side of the lower frame including the second end portion. The end portion of the holding frame corresponding to the first end portion may be provided with the projection such that the projection extends from a side wall of the holding frame to the rear side and is fitted with the cutout.

The upper frame may cover side surfaces of the display panel and the holding frame, and may be fixed to a side wall of the lower frame with a fastener.

The display device may further include drive circuits provided at the display panel outside an image display area in a planar view. The drive circuits are provided respectively on the left, right, top and bottom of the image display area.

According to the configuration of the display device of the present disclosure, it is possible to prevent errors in assembling frames, as well as to prevent display qualities from deteriorating.

BRIEF DESCRIPTION OF THE DRAWINGS

In the accompanying drawings:

FIG. 4A is a lateral side view of the lower frame F1 when viewed in an X direction in FIG. 3.

FIG. 4B is a top side view of the lower frame F1 when viewed in a Y1 direction in FIG. 3.

FIG. 4C is a bottom side view of the lower frame F1 when viewed in a Y2 direction in FIG. 3.

FIG. 7 is a plan view illustrating a configuration of a holding frame F2.

FIG. 8A is a lateral side view of the holding frame F2 when viewed in an X direction in FIG. 7.

FIG. 8B is a top side view of the holding frame F2 when viewed in a Y1 direction in FIG. 7.

FIG. 8C is a bottom side view of the holding frame F2 when viewed in a Y2 direction in FIG. 7.

FIG. 11 is a plan view illustrating a configuration of an upper frame F3.

FIG. 12A is a lateral side view of the upper frame F3 when viewed in an X direction in FIG. 11.

FIG. 12B is a top side view of the upper frame F3 when viewed in a Y1 direction in FIG. 11.

FIG. 15 is a perspective view of the end portions in a state in which the lower frame F1, the holding frame F2, and the upper frame F3 are fitted with each other.

DETAILED DESCRIPTION

Figure 1:
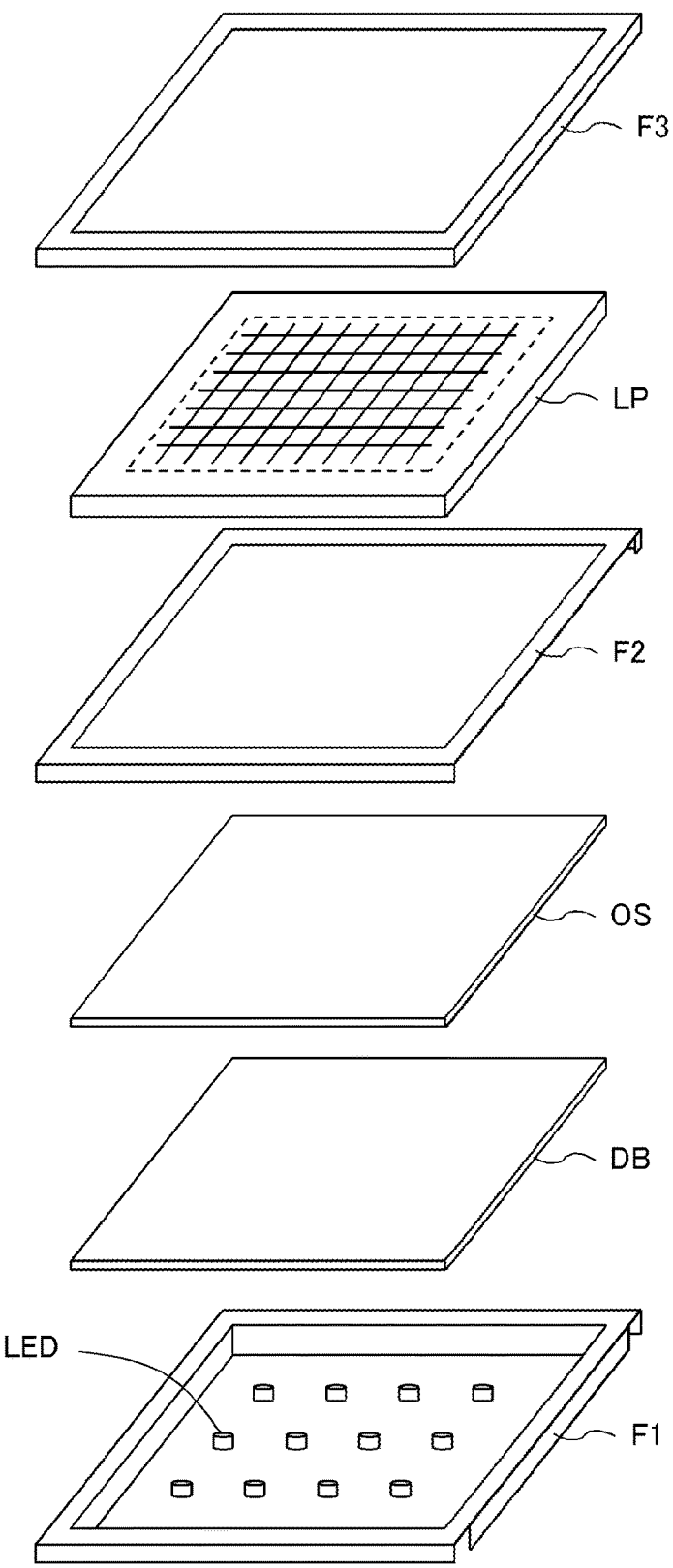
FIG. 1 is a perspective view schematically illustrating a configuration of a liquid crystal display device according to an exemplary embodiment of the present disclosure.

Exemplary display devices are described below with reference to the drawings. In the following embodiments, similar constituent elements are assigned with similar reference numerals. Redundant explanation is omitted as appropriate to clarify the description. Configurations, arrangements and shapes shown in the drawings and description relating to the drawings aim to make principles of the embodiments easily understood. Therefore, the principles of the present embodiments are not limited thereto. It is to be understood that the following disclosure provides many different embodiments, or examples, for implementing different features of the present subject matter. Specific embodiments or examples of components and arrangements are described below to simplify the present disclosure. These are, of course, merely examples and are not intended to be limiting. For example, dimensions of elements are not limited to the disclosed range or values, but may depend upon process conditions and/or desired properties of the device. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Various features may be arbitrarily drawn in different scales for simplicity and clarity.

Further, spatially relative terms, such as "beneath," "below," "bottom," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. In addition, the term "made of" may mean either "comprising" or "consisting of."

In the exemplary embodiment of the present disclosure, although a liquid crystal display device is described as an example, the display device according to the present disclosure is not limited to the liquid crystal display device, and may be an organic EL display device or the like.

FIG. 1 is a perspective view schematically illustrating a configuration of the liquid crystal display device according to an exemplary embodiment. A liquid crystal display device (LCD) includes a display panel LP and a backlight disposed on a rear side of the display panel LP. The liquid crystal display device (LCD) also includes a lower frame F1 (first frame) that accommodates a light source LED, a diffuser plate DB, and an optical sheet OS that constitute the backlight, a frame-shaped holding frame F2 (second frame) that holds the display panel LP and is fixed to the lower frame F1 with a fastener (e.g., screw), and a frame-shaped upper frame F3 that covers the display panel LP from a display surface side and is fixed to the lower frame F1 with a fastener (e.g., screw). The upper frame F3 may be fixed to the holding frame F2 with a fastener (e.g., screw).

Figure 2:
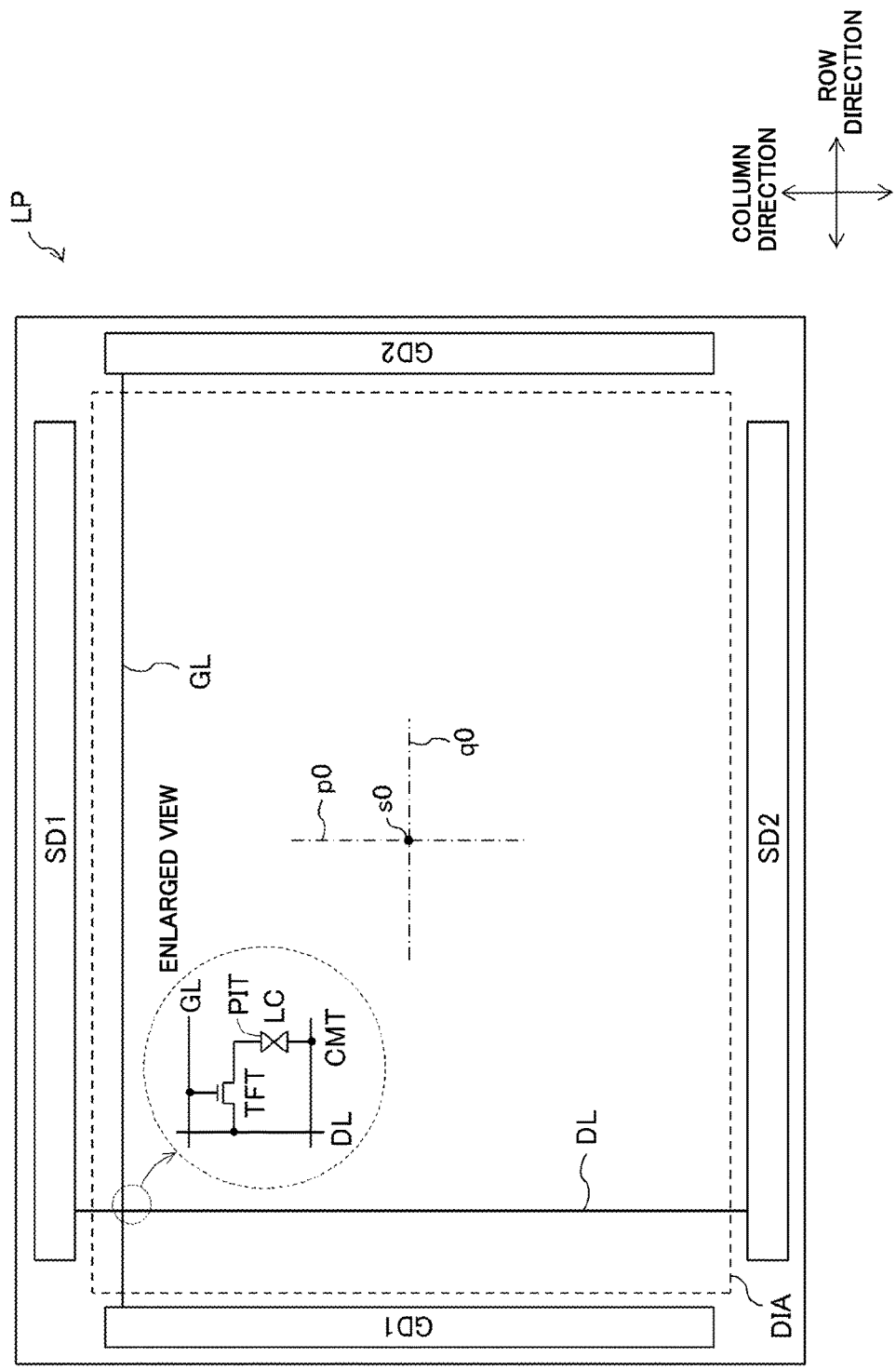
FIG. 2 is a plan view illustrating a schematic configuration of a display panel.

FIG. 2 is a plan view illustrating a schematic configuration of the display panel LP. The display panel LP includes an image display area DIA and a picture-frame area that surrounds the image display area DIA. Although not illustrated in the drawings, the display panel LP includes a thin film transistor substrate (TFT substrate) disposed on the rear side, a color filter substrate (CF substrate) disposed on the display surface side and facing the TFT substrate, and a liquid crystal layer sandwiched between the TFT substrate and the CF substrate. The TFT substrate is provided with a plurality of data lines DL extending in a column direction, and a plurality of gate lines GL extending in a row direction.

In the image display area DIA, a plurality of pixels are arranged in a matrix of the row direction and the column direction, and each pixel is surrounded by two adjacent data lines DL and two adjacent gate lines GL. Each pixel is provided with a pixel electrode PIT, a common electrode CMT facing the pixel electrode PIT, and a thin film transistor TFT disposed near one of the intersections of the data lines DL and the gate lines GL.

In the picture-frame area, drive circuits for displaying an image in the image display area DIA are disposed. The drive circuits are respectively provided on a left, right, top and bottom of the image display area DIA in a planar view. Specifically, in the planar view, the gate drivers GD1 and GD2 are provided on the left and right of the image display area DIA, and the source drivers SD1 and SD2 are provided on the top and bottom of the image display area DIA. Here, the gate drivers GD1 and GD2 are positioned symmetrically (left-right symmetric) to each other about a center line p0 in the column direction of the display panel LP and the image display area DIA. Similarly, the source drivers SD1 and SD2 are positioned symmetrically (top-bottom symmetric) to each other about a center line q0 in the row direction of the display panel LP and the image display area DIA. An intersection of the center lines p0 and q0 is taken as a center point s0.

Figure 3:
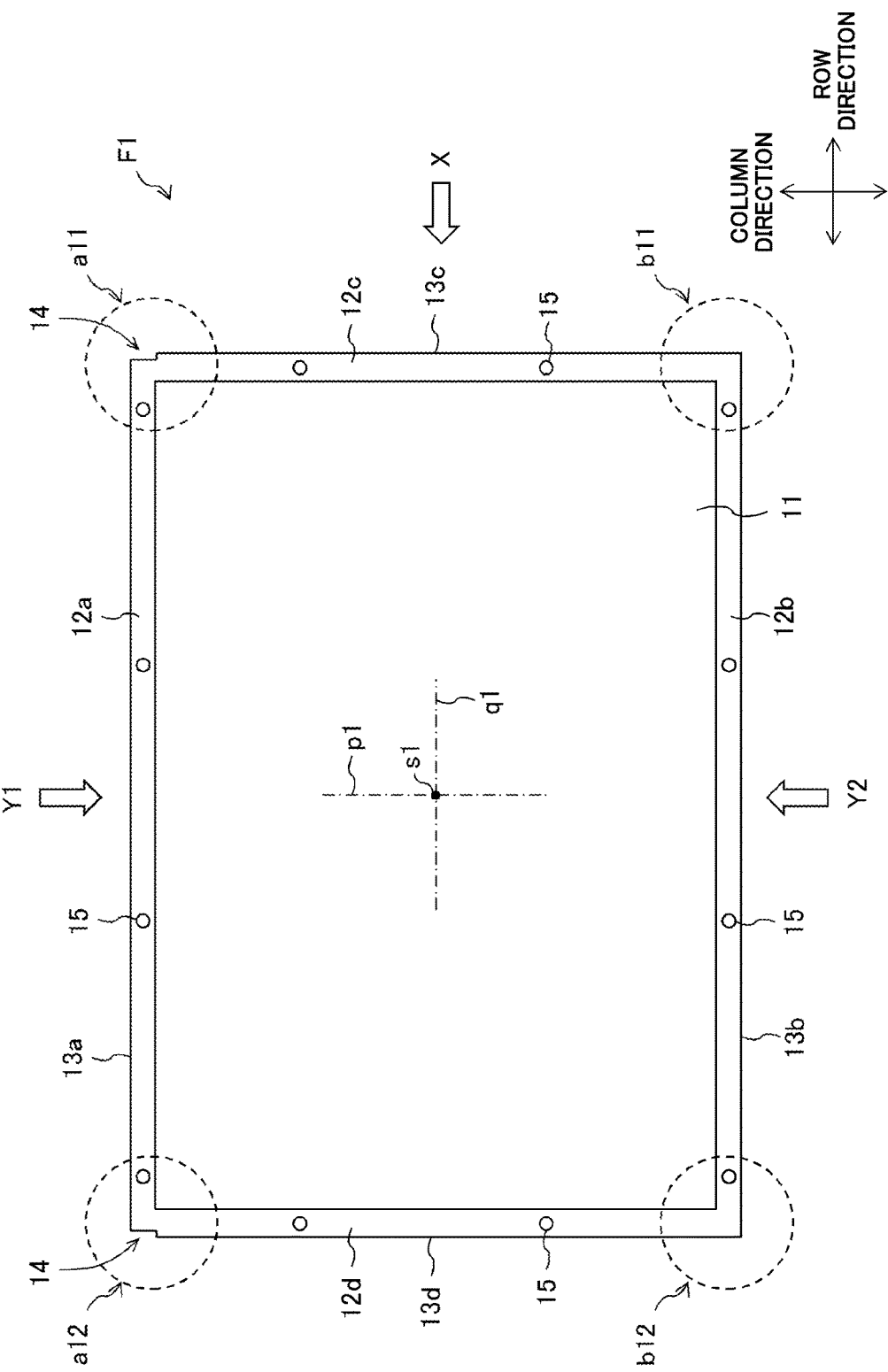
FIG. 3 is a plan view illustrating a configuration of a lower frame.

FIG. 3 is a plan view illustrating a configuration of the lower frame F1. FIG. 3 illustrates a center line p1 in the column direction and a center line q1 in the row direction of the lower frame F1, and an intersection (center point) s1 of the center lines p1 and q1. Here, positions of the center lines p1 and q1 and the center point s1 are respectively identical with the positions of the center lines p0 and q0 and the center point s0 of the display panel LP in a planar view.

Figure 5A:
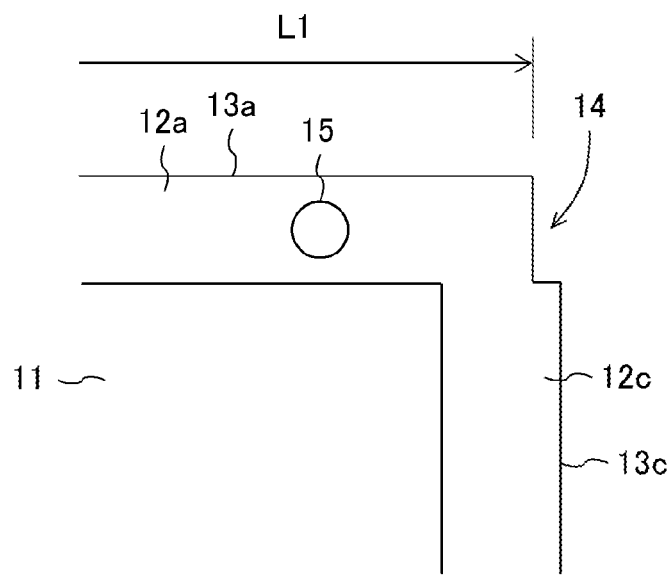
FIG. 5A is an enlarged view of an end portion a11 in FIG. 3.
Figure 5B:
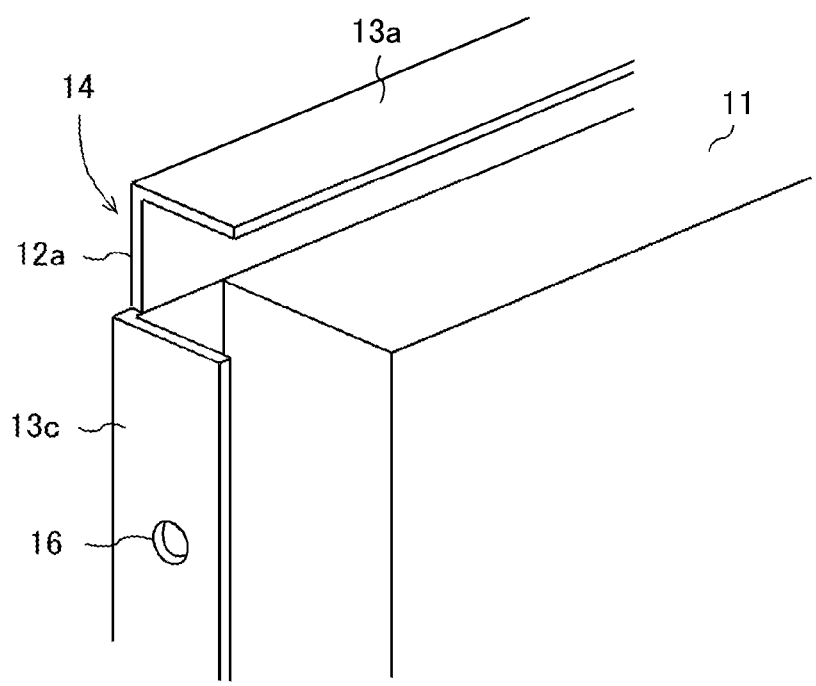
FIG. 5B is a perspective view of the end portion a11 viewed from a rear side.
Figure 6A:
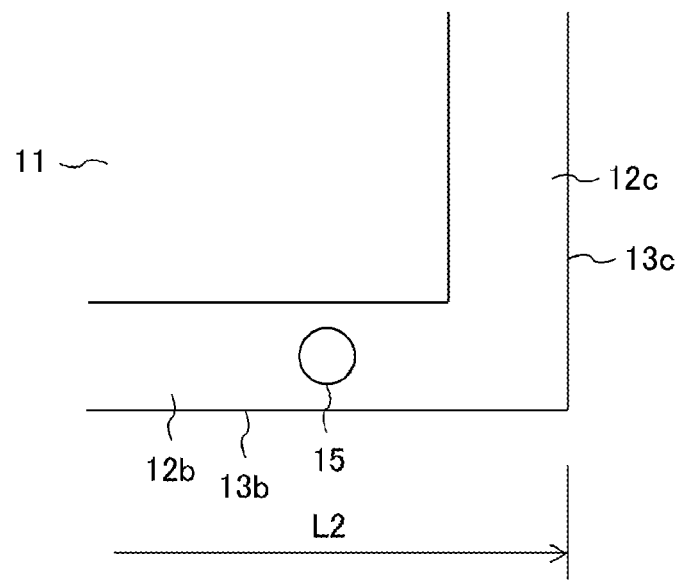
FIG. 6A is an enlarged view of an end portion b11 in FIG. 3.
Figure 6B:
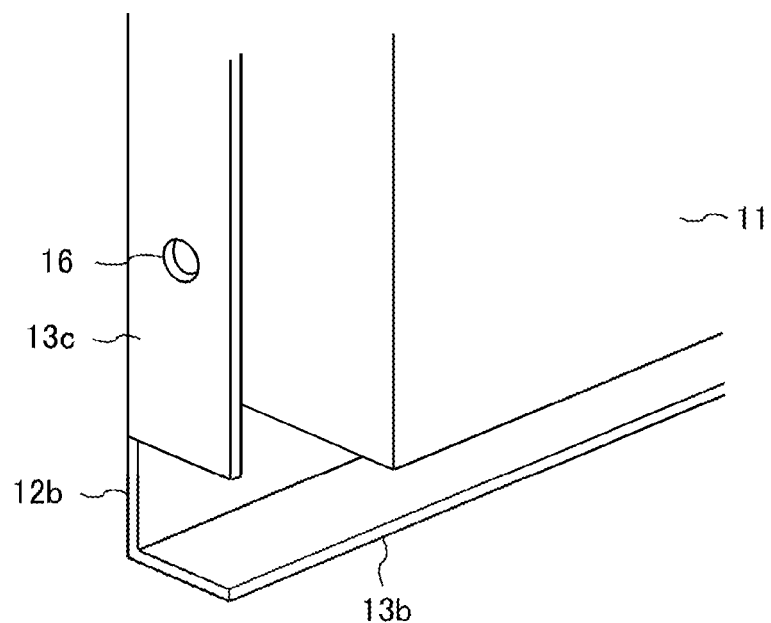
FIG. 6B is a perspective view of the end portion b11 viewed from the rear side.

FIG. 4A is a lateral side view of the lower frame F1 when viewed in an X direction in FIG. 3, FIG. 4B is a top side view of the lower frame F1 when viewed in a Y1 direction in FIG. 3, and FIG. 4C is a bottom side view of the lower frame F1 when viewed in a Y2 direction in FIG. 3. FIG. 5A is an enlarged view of an end portion a11 in FIG. 3, and FIG. 5B is a perspective view of the end portion a11 viewed from the rear side. FIG. 6A is an enlarged view of an end portion b11 in FIG. 3, and FIG. 6B is a perspective view of the end portion b11 viewed from the rear side. Here, while FIG. 4A illustrates a right side view of the lower frame F1, a left side view of the lower frame F1 is left-right symmetric to the right side view.

The lower frame F1 includes a recessed accommodating portion 11 that accommodates the light source LED, a placement portion 12 that extends from an end portion of an opening side of the accommodating portion 11 in a planar manner, and on which the diffuser plate DB and the optical sheet OS are placed, and a side wall 13 that extends from the end portion of the placement portion 12 to the rear side. The lower frame F1 includes four end portions a11, a12, b11, and b12.

The placement portion 12 includes an upper placement portion 12a, a lower placement portion 12b, a right placement portion 12c, and a left placement portion 12d. The side wall 13 includes an upper side wall 13a, a lower side wall 13b, a right side wall 13c, and a left side wall 13d. The upper placement portion 12a and the upper side wall 13a correspond to an upper long side of the lower frame F1 including the end portions a11 and a12, and the lower placement portion 12b and the lower side wall 13b correspond to a lower long side of the lower frame F1 including the end portions b11 and b12. Further, the right placement portion 12c and the right side wall 13c correspond to a right short side of the lower frame F1 including the end portions a11 and b11, and the left placement portion 12d and the left side wall 13d correspond to a left short side of the lower frame F1 including the end portions a12 and b12.

Each of the end portions a11 and a12 of the lower frame F1 is provided with a cutout 14 (first fitting portion). Specifically, as illustrated in FIG. 5, the end portion a11 of the upper placement portion 12a and the upper side wall 13a is provided with the cutout 14. Similarly, the end portion a12 is provided with the cutout 14. By contrast, as illustrated in FIG. 6, the end portions b11 and b12 of the lower placement portion 12b and the lower side wall 13b are not provided with the cutout 14. The end portion a11 and the end portion a12 are left-right symmetric, and the end portion b11 and the end portion b12 are left-right symmetric.

The cutout 14 is provided at the end portion a11, but is not provided at the end portion b12 that is point symmetric to the end portion a11 about the center point s1 of the lower frame F1. Similarly, the cutout 14 is provided at the end portion a12, but is not provided at the end portion b11 that is point symmetric to the end portion a12 about the center point s1 of the lower frame F1. In this manner, the cutouts 14 are provided at positions point asymmetric about the center point s1 of the lower frame F1 in a planar view.

With the above configuration, as illustrated in FIGS. 4A to 6B, a length L1 of the long side (upper side) of the lower frame F1 including the end portions a11 and a12 is shorter than a length L2 of the long side (lower side) of the lower frame F1 including the end portions b11 and b12 (L1<L2).

The positions at which the cutouts 14 are provided are not limited to the end portions a11 and a12. The cutout 14 may be provided at at least one of the four end portions a11, a12, b11, and b12.

As illustrated in FIG. 3, the placement portion 12 is provided with holes 15 (e.g., threaded holes) for fixing the lower frame F1, the holding frame F2, and the upper frame F3 to each other with a fastener (e.g., screw). The holes 15 are provided at positions point symmetric about the center point s1 of the lower frame F1 in a planar view. While FIG. 3 illustrates twelve holes 15, the number of holes 15 is not particularly limited. The placement portion 12 may also be provided with a hole (opening) used for a purpose different from that of the holes 15 for fixing the lower frame F1, the holding frame F2, and the upper frame F3 to each other.

As illustrated in FIG. 4A, the side wall 13 (the right side wall 13c and the left side wall 13d) is provided with holes 16 (e.g., threaded holes) for fixing the lower frame F1 and the upper frame F3 to each other with a fastener (e.g., screw). The holes 16 are provided at positions point symmetric about the center point s1 of the lower frame F1 in a planar view. While FIG. 4A illustrates two holes 16 for one side wall, the number of holes 16 is not particularly limited. The side wall 13 may also be provided with a hole (opening) used for a purpose different from that of the holes 16 for fixing the lower frame F1 and the upper frame F3 to each other.

FIG. 7 is a plan view illustrating a configuration of the holding frame F2. FIG. 7 illustrates a center line p2 in the column direction and a center line q2 in the row direction of the holding frame F2, and an intersection (center point) s2 of the center lines p2 and q2. Here, positions of the center lines p2 and q2 and the center point s2 are respectively identical with the positions of the center lines p0 and q0 and the center point s0 of the display panel LP in a planar view.

Figure 9A:
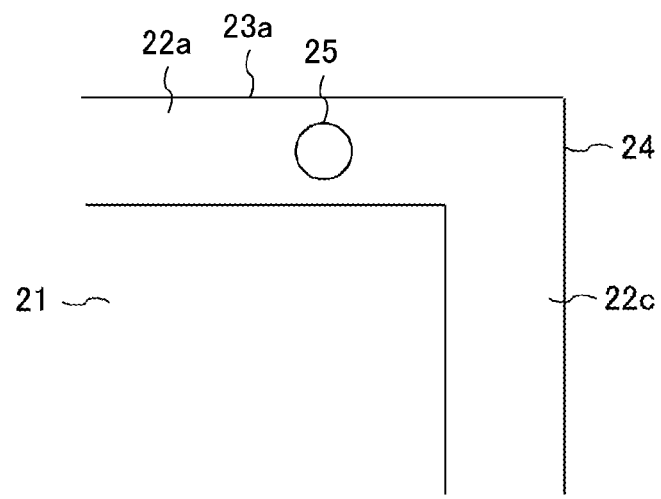
FIG. 9A is an enlarged view of an end portion a21 in FIG. 7.
Figure 9B:
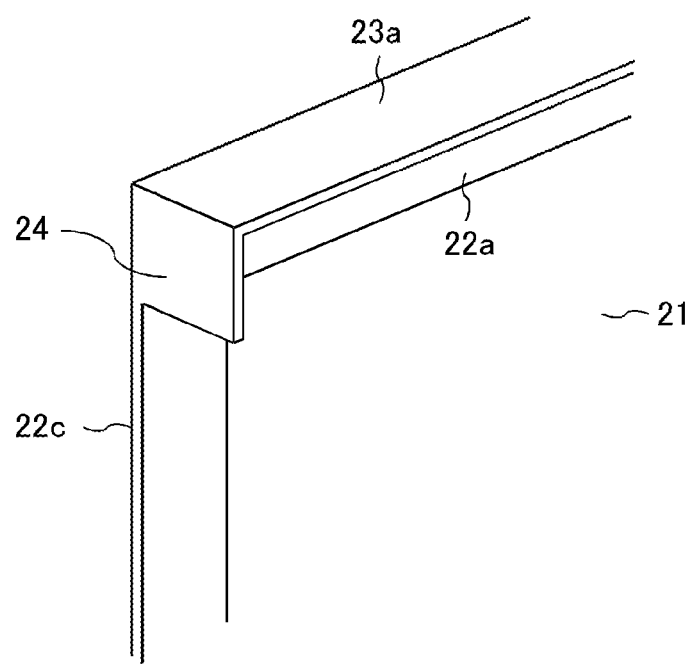
FIG. 9B is a perspective view of the end portion a21 viewed from the rear side.
Figure 10A:
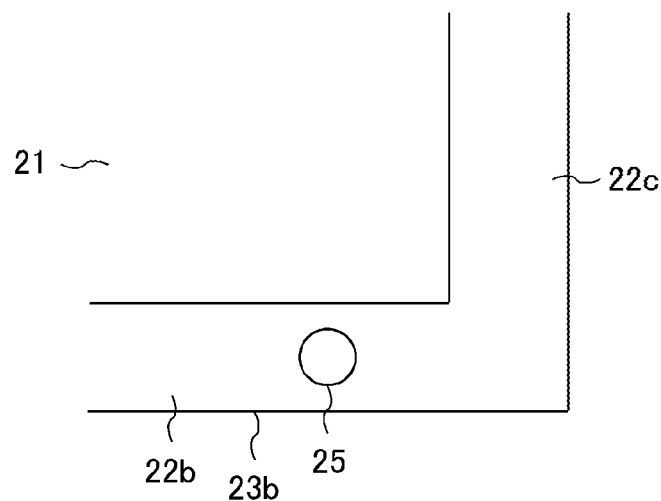
FIG. 10A is an enlarged view of an end portion b21 in FIG. 7.
Figure 10B:
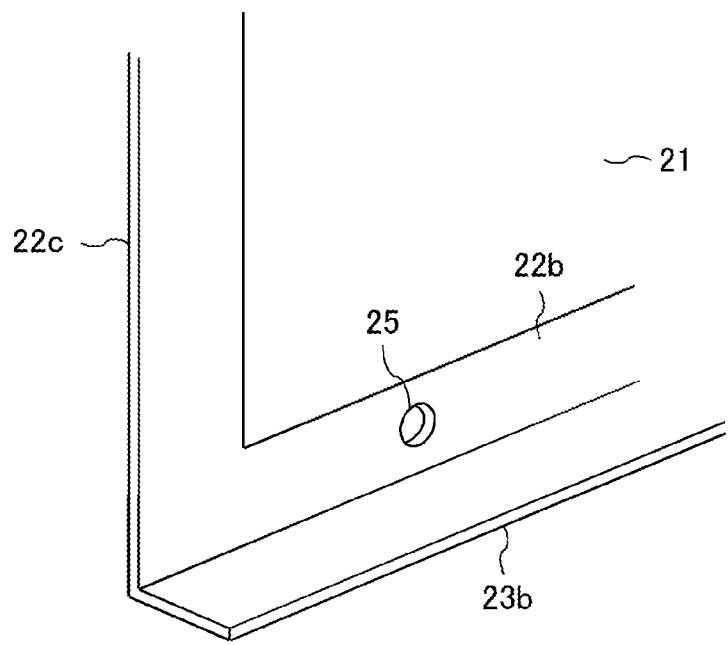
FIG. 10B is a perspective view of the end portion b21 viewed from the rear side.

FIG. 8A is a lateral side view of the holding frame F2 when viewed in an X direction in FIG. 7. FIG. 8B is a top side view of the holding frame F2 when viewed in a Y1 direction in FIG. 7. FIG. 8C is a bottom side view of the holding frame F2 when viewed in a Y2 direction in FIG. 7. FIG. 9A is an enlarged view of an end portion a21 in FIG. 7, and FIG. 9B is a perspective view of the end portion a21 viewed from the rear side. FIG. 10A is an enlarged view of an end portion b21 in FIG. 7, and FIG. 10B is a perspective view of the end portion b21 viewed from the rear side. Here, while FIG. 8A illustrates a right side view of the holding frame F2, a left side view of the holding frame F2 is left-right symmetric to the right side view.

The holding frame F2 includes an opening 21 facing the opening area of the accommodating portion 11 of the lower frame F1 (see FIG. 3), a placement portion 22 that extends in a planar manner and on which the display panel LP is placed, a supporting portion 27 provided on the placement portion 22 and supporting the display panel LP, and a side wall 23 that extends from an end portion of the placement portion 22 to the rear side. The holding frame F2 includes four end portions a21, a22, b21, and b22 respectively corresponding to the four end portions a11, a12, b11, and b12 of the lower frame F1.

The placement portion 22 includes an upper placement portion 22a, a lower placement portion 22b, a right placement portion 22c, and a left placement portion 22d. The side wall 23 includes an upper side wall 23a and a lower side wall 23b. The upper placement portion 22a and the upper side wall 23a correspond to an upper long side of the holding frame F2 including the end portions a21 and a22, and the lower placement portion 22b and the lower side wall 23b correspond to a lower long side of the holding frame F2 including the end portions b21 and b22. Further, the right placement portion 22c corresponds to a right short side of the holding frame F2 including the end portions a21 and b21, and the left placement portion 22d corresponds to a left short side of the holding frame F2 including the end portions a22 and b22.

Each of the end portions a21 and a22 of the holding frame F2 is provided with a projection 24 (second fitting portion). Specifically, as illustrated in FIGS. 9A and 9B, the projection 24 is provided at the end portion a21 so as to extend from the right placement portion 22c to the rear side. Similarly, the projection 24 is provided at the end portion a22 so as to extend from the left placement portion 22d to the rear side. By contrast, as illustrated in FIGS. 10A and 10B, the projection 24 is not provided at the end portions b21 and b22 of the lower placement portion 22b and the lower side wall 23b. The end portion a21 and the end portion a22 are left-right symmetric, and the end portion b21 and the end portion b22 are left-right symmetric.

The projection 24 of the end portion a21 is provided at a position at which the projection 24 is fitted with the cutout 14 of the end portion a11 of the lower frame F1 (see FIG. 3), and the projection 24 of the end portion a22 is provided at a position at which the projection 24 is fitted with the cutout 14 of the end portion a12 of the lower frame F1 (see FIG. 3).

Moreover, the projection 24 is provided at the end portion a21, but is not provided at the end portion b22 that is point symmetric to the end portion a21 about the center point s2 of the holding frame F2. Similarly, the projection 24 is provided at the end portion a22, but is not provided at the end portion b21 that is point symmetric to the end portion a22 about the center point s2 of the holding frame F2. In this manner, similarly to the cutout 14. The projections 24 are provided at positions point asymmetric about the center point s2 of the holding frame F2 in a planar view.

The positions at which the projections 24 are provided are not limited to the end portions a21 and a22. The projection 24 may be provided at least one of the four end portions a21, a22, b21, and b22, so as to correspond to the position at which the cutout 14 is provided.

As illustrated in FIG. 7, the placement portion 22 is provided with holes 25 (e.g., threaded holes) for fixing the lower frame F1, the holding frame F2, and the upper frame F3 to each other with a fastener (e.g., screw). The holes 25 are provided at positions point symmetric about the center point s2 of the holding frame F2 in a planar view. Further, the holes 25 are provided so as to face the holes 15 in the lower frame F1. While FIG. 7 illustrates twelve holes 25, the number of holes 25 is not particularly limited. The placement portion 22 may also be provided with a hole (opening) used for a purpose different from that of the holes 25 for fixing the lower frame F1, the holding frame F2, and the upper frame F3 to each other.

As illustrated in FIG. 7 and FIG. 8, the supporting portion 27 can be a projection extending from the lower placement portion 22b. The supporting portion 27 has a function of supporting the display panel LP from below when the liquid crystal display device ( ) stands on its own. The positions at which the supporting portions 27 are provided and the number of the supporting portions 27 are not particularly limited.

FIG. 11 is a plan view illustrating a configuration of the upper frame F3. FIG. 11 illustrates a center line p3 in the column direction and a center line q3 in the row direction of the upper frame F3, and an intersection (center point) s3 of the center lines p3 and q3. Here, positions of the center lines p3 and q3 and the center point s3 are respectively identical with the positions of the center lines p0 and q0 and the center point s0 of the display panel LP in a planar view.

Figure 13A:
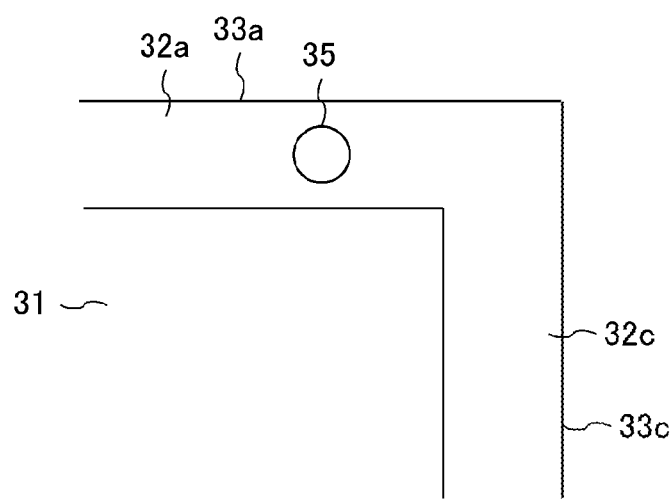
FIG. 13A is an enlarged view of an end portion a31 in FIG. 11.
Figure 13B:
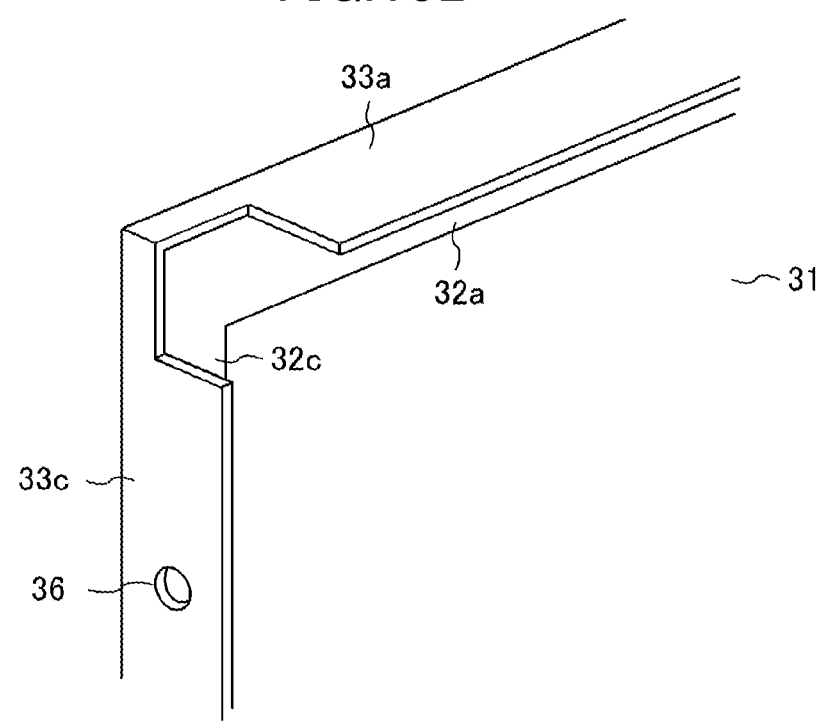
FIG. 13B is a perspective view of the end portion a31 viewed from the rear side.
Figure 14A:
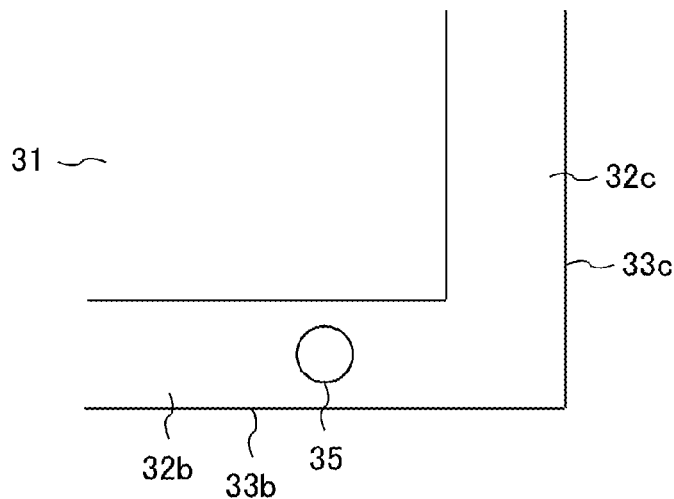
FIG. 14A is an enlarged view of an end portion b31 in FIG. 11.
Figure 14B:
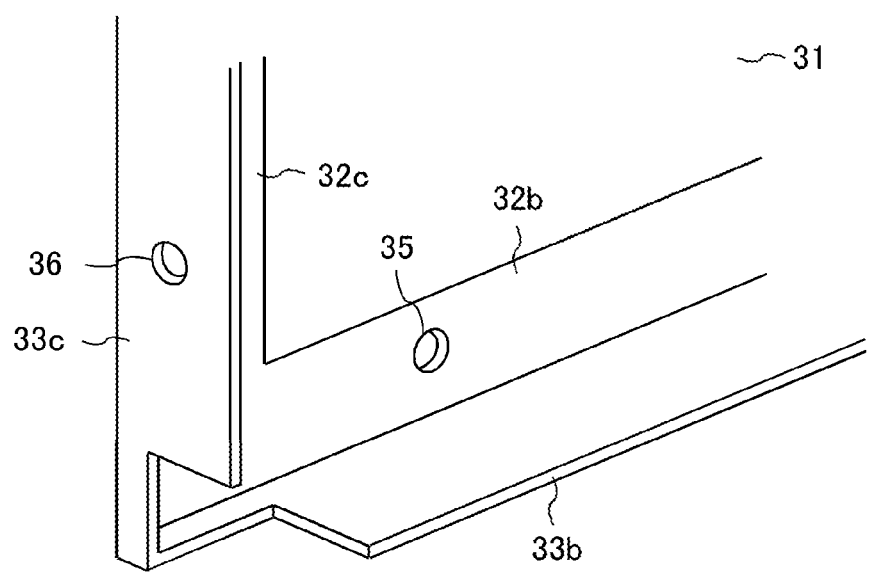
FIG. 14B is a perspective view of the end portion b31 viewed from the rear side.

FIG. 12A is a lateral side view of the upper frame F3 when viewed in an X direction in FIG. 11, and FIG. 12B is a top side view of the upper frame F3 when viewed in a Y1 direction in FIG. 11. FIG. 13A is an enlarged view of an end portion a31 in FIG. 11, and FIG. 13B is a perspective view of the end portion a31 viewed from the rear side. FIG. 14A is an enlarged view of an end portion b31 in FIG. 11, and FIG. 14B is a perspective view of the end portion b31 viewed from the rear side. Here, while FIG. 12A illustrates a right side view of the upper frame F3, the left side view of the upper frame F3 is left-right symmetric to the right side view. Further, while FIG. 12B illustrates an upper side view of the upper frame F3, the lower side view of the upper frame F3 is top-bottom symmetric to the upper side view.

The upper frame F3 includes an opening 31 facing the opening area of the accommodating portion 11 of the lower frame F1 (see FIG. 3) and the image display area DIA of the display panel LP (see FIG. 2), a front portion 32 that extends in a planar manner and facing the picture-frame area of the display panel LP, and a side wall 33 that extends from an end portion of the front portion 32 to the rear side. The upper frame F3 includes four end portions a31, a32, b31, and b32 respectively corresponding to the four end portions a11, a12, b11, and b12 of the lower frame F1, as well as to the four end portions a21, a22, b21, and b22 of the holding frame F2.

The front portion 32 includes an upper front portion 32a, a lower front portion 32b, a right front portion 32c, and a left front portion 32d. The side wall 33 includes an upper side wall 33a, a lower side wall 33b, a right side wall 33c, and a left side wall 33d. The upper front portion 32a and the upper side wall 33a correspond to an upper long side of the upper frame F3 including the end portions a31 and a32, and the lower front portion 32b and the lower side wall 33b correspond to a lower long side of the upper frame F3 including the end portions b31 and b32. Further, the right front portion 32c and the right side wall 33c correspond to a right short side of the upper frame F3 including the end portions a31 and b31, and the left front portion 32d and the left side wall 33d correspond to a left short side of the upper frame F3 including the end portions a32 and b32.

As illustrated in FIG. 11, the front portion 32 is provided with holes 35 (e.g., threaded holes) for fixing the lower frame F1, the holding frame F2, and the upper frame F3 to each other with a fastener (e.g., screw). The holes 35 are provided at positions point symmetric about the center point s3 of the upper frame F3 in a planar view. Further, the holes 35 are provided so as to face the holes 15 in the lower frame F1 and the holes 25 in the holding frame F2. While FIG. 11 illustrates twelve holes 35, the number of the holes 35 is not particularly limited. The front portion 32 may also be provided with a hole (opening) used for a purpose different from that of the holes 35 for fixing the lower frame F1, the holding frame F2, and the upper frame F3 to each other.

As illustrated in FIG. 12A, the side wall 33 (the right side wall 33c and the left side wall 33d) is provided with holes 36 (e.g., threaded holes) for fixing the lower frame F1 and the upper frame F3 to each other with a fastener (e.g., screw). The holes 36 are provided at positions point symmetric about the center point s3 of the upper frame F3 in a planar view. Further, the holes 36 are provided so as to face the holes 16 in the lower frame F1. While FIG. 12A illustrates two holes 36 on one side wall, the number of the holes 36 is not particularly limited. The side wall 33 may also be provided with a hole (opening) used for a purpose different from that of the holes 36 for fixing the lower frame F1 and the upper frame F3 to each other.

Moreover, the side wall 33 of the upper frame F3 has such a length as to cover the corresponding side wall of the lower frame F1 and the holding frame F2 when the lower frame F1, the holding frame F2, and the upper frame F3 are fixed to each other.

FIG. 15 is a perspective view of the end portions in a state in which the lower frame F1, the holding frame F2, and the upper frame F3 are fitted with each other. FIG. 15 illustrates the end portions a11, a21, and a31 respectively of the frames F1, F2, and F3. Although not illustrated in FIG. 15, as illustrated in FIG. 1, the diffuser plate DB and the optical sheet OS are sandwiched between the lower frame F1 and the holding frame F2, and the display panel LP is sandwiched between the holding frame F2 and the upper frame F3. Hereinafter, one example of an exemplary process (assembly process) for manufacturing a liquid crystal display device (LCD) is described with reference to FIG. 15.

First, a worker sets the lower frame F1 on a work table, and then places the light source LED in the accommodating portion 11 of the lower frame F1. Next, the worker places the diffuser plate DB and the optical sheet OS on the lower frame F1 in this order. For example, the diffuser plate DB is placed on the lower frame F1 such that an end portion of the diffuser plate DB is placed on the placement portion 12 of the lower frame F1. The lower frame F1 may have a mark for the worker to distinguish the upper side and the lower side of the frame.

Then, the worker sets the holding frame F2 such that the holding frame F2 covers the lower frame F1 to which the backlight is assembled. Here, when the worker sets the top-bottom orientation of the holding frame F2 correctly, the projections 24 of the holding frame F2 are fitted with the cutouts 14 of the lower frame F1. With this configuration and process, the holding frame F2 may be assembled to the lower frame F1 without being displaced to the right and left. However, if the worker sets the holding frame F2 such that the top-bottom orientation of the holding frame F2 is reversed (e.g., rotated by 180 degrees), the projections 24 of the holding frame F2 are brought into contact with the placement portions 12 of the lower frame F1 (the end portions of the lower placement portion 12b illustrated in FIG. 6, for example), and the holding frame F2 is floating (spaced apart) above the lower frame F1 at the contact portion. In this case, the worker recognizes that the top-bottom orientation of the holding frame F2 is reversed, and therefore re-sets the top-bottom orientation of the holding frame F2 correctly.

Next, the worker sets the display panel LP on the holding frame F2. For example, the worker sets the display panel LP on the holding frame F2 by positioning a lower end portion of the display panel LP to be brought into contact with the supporting portion 27 of the holding frame F2 (see FIG. 7 and FIG. 8). Then, the worker sets the upper frame F3 such that the upper frame F3 covers the display panel LP. The upper frame F3 may have a mark for the worker to distinguish the upper side and the lower side of the frame. Finally, the worker fixes the lower frame F1, the holding frame F2, and the upper frame F3 to each other with a fastener (e.g., screw).

According to such a configuration of the liquid crystal display device (LCD) of this exemplary embodiment, it is possible to prevent an error in assembling the frames with the top-bottom orientation incorrectly reversed in the manufacturing process of the liquid crystal display device (LCD). Further, according to the above configuration, the holes (e.g., threaded holes) for fixing the lower frame F1, the holding frame F2, and the upper frame F3 to each other with a fastener (e.g., screw) are provided point symmetric, in a planar view, about a center of the frames. Therefore, it is possible to prevent display qualities from deteriorating due to the displacement of the fastening positions (left-right asymmetry). To be more precise, the deterioration of display qualities may possibly occur because when the fastening positions are not left-right symmetric, a space between the display panel and a structural object (frame or the like) may become uneven and a load due to oscillation or an impact, for example, may be applied unevenly to the display panel. As used herein, the description "the holes are point symmetric about the center of the frame in a planar view" refers to a state in which the positions of the fastening holes match to an extent that the lower frame F1 and the holding frame F2 can be assembled and fixed to each other with a fastener (e.g., screw), if the cutout 14 or the projection 24 is not provided when one of the lower frame F1 and the holding frame F2 is set such that the top-bottom orientation of the frame is reversed (e.g., rotated by 180 degrees), for example.

The display device according to the present disclosure is not limited to the above exemplary configuration. For example, the positions at which the cutout 14 of the lower frame F1 and the projection 24 of the holding frame F2 are provided may not be the end portions of the corresponding frames. For example, the cutout 14 and the projection 24 may be provided at positions between both end portions along the long side or the short side of the corresponding frames. Further, the lower frame F1 may be provided with the projection 24, and the holding frame F2 may be provided with the cutout 14. Moreover, the shapes of the cutout 14 and the projection 24 are not particularly limited, and may be any shape as long as they can be fitted with each other.

Furthermore, the holding frame F2 and the upper frame F3 may be provided integrally. Alternatively, the lower frame F1 and the holding frame F2 may be provided integrally. In this case, the integrated frame may be provided with the cutout 14 or the projection 24. Specifically, the liquid crystal display device (LCD) may include at least two frames.

The present disclosure can be suitable for a display panel LP having a top-bottom and left-right symmetric configuration in which the gate drivers GD1 and GD2 are disposed respectively on the left and right of the image display area DIA, and the source drivers SD1 and SD2 are disposed respectively on the top and bottom of the image display area DIA. However, the display panel LP is not limited to the above configuration. The present disclosure may be applied to known display panels. Further, the backlight is not limited to the above configuration, and a backlight of a known configuration may be employed.

The foregoing outlines features of several embodiments or examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments or examples introduced herein. Those skilled in the art should also realize that such equivalent constructions do not depart from the spirit and scope of the present disclosure, and that they may make various changes, substitutions, and alterations herein without departing from the spirit and scope of the present disclosure.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A display device comprising:
   a display panel; and
   a frame that accommodates the display panel, wherein:
   the frame includes at least a first frame and a second frame,
   the first frame and the second frame are fixed to each other with a fastener,
   each of the first frame and the second frame is provided with fastening holes for fixing the first frame and the second frame to each other, the fastening holes being arranged at positions point symmetric about a center of the corresponding frame in a planar view,
   the first frame includes at least one first fitting portion,
   the second frame includes at least one second fitting portion to be fitted with the first fitting portion, and
   the first fitting portion is provided at a position point asymmetric about the center of the first frame in a planar view, and the second fitting portion is provided at a position point asymmetric about the center of the second frame in a planar view, such that the first frame and the second frame are assembled by the first fitting portion being fitted with the second fitting portion when the first frame and the second frame are placed in a first orientation, and the first frame and the second frame are not assembled and spaced apart with each other when one of the first frame and the second frame is rotated by 180 degrees from the first orientation.

2. The display device according to claim 1, further comprising:
   a backlight disposed on a rear side of the display panel, wherein
   the second frame is a frame-shaped holding frame that holds the display panel, the first frame is a lower frame that accommodates the backlight, and the frame further includes a frame-shaped upper frame that covers the display panel from a display surface side.

3. The display device according to claim 2, wherein
   out of four end portions of the lower frame, at least one first end portion is provided with the first fitting portion, and a second end portion that is point symmetric to the first end portion about the center of the lower frame is provided with no first fitting portion, and
   out of four end portions of the holding frame, an end portion corresponding to the first end portion is provided with the second fitting portion, and an end portion corresponding to the second end portion is provided with no second fitting portion.

4. The display device according to claim 3, wherein
   the first fitting portion is a cutout, and the second fitting portion is a projection.

5. The display device according to claim 4, wherein
   the cutout is provided such that an upper side of the lower frame including the first end portion is shorter than a lower side of the lower frame including the second end portion, and
   the end portion of the holding frame corresponding to the first end portion is provided with the projection such that the projection extends from a side wall of the holding frame to the rear side and is fitted with the cutout.

6. The display device according to claim 2, wherein
the upper frame covers side surfaces of the display panel and the holding frame, and is fixed to a side wall of the lower frame with a fastener.

7. The display device according to claim 1, further comprising:
drive circuits provided at the display panel outside an image display area in a planar view, the drive circuits being provided respectively on the left, right, top and bottom of the image display area.

8. The display device according to claim 1, wherein:
the first frame and the second frame have side walls,
the first frame has a cutout in at least one of side wall in at least one side,
the second frame has a partial side wall in at least one side, and
the first frame and the second frame are assembled by the partial side wall being fitted with the cutout, and the at least one of the side wall and the partial side wall are coplanar, when the first frame and the second frame are placed in the first orientation.

9. The display device according to claim 8, wherein
the first frame has no cutout in a side wall in one side opposite to the at least one side, and
the first frame and the second frame are not assembled and spaced apart with each other by the partial side wall interfering with the side wall in the one side when one of the first frame and the second frame is rotated by 180 degrees from the first orientation.

\* \* \* \* \*